United States Patent Office 3,273,281
Patented Sept. 20, 1966

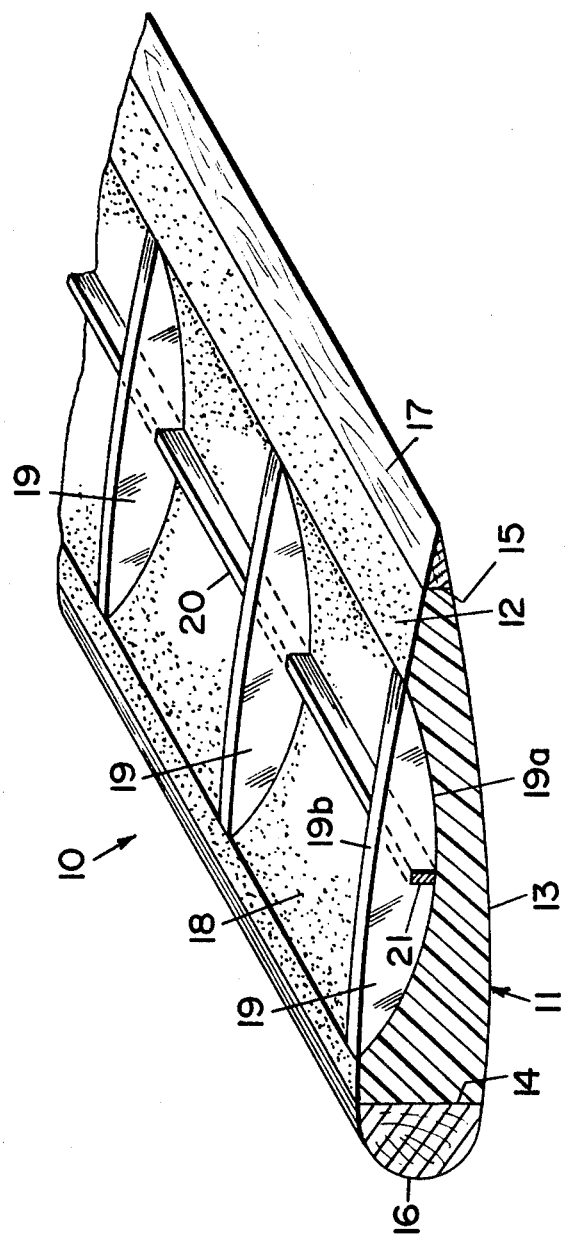

3,273,281
MODEL AIRCRAFT WING CONSTRUCTION
Lawrence V. Harrison, Portage La Prairie, Manitoba, Canada (P.O. Box 1291, Sackville, New Brunswick, Canada)
Filed Oct. 4, 1965, Ser. No. 492,514
3 Claims. (Cl. 46—76)

This application is a continuation-in-part of my copending application Serial No. 326,133, filed November 26, 1963.

My invention relates to new and useful improvements in model construction and particularly concerns itself with construction of model aircraft wings.

In accordance with conventional practice, model aircraft wings are composed of leading and trailing edge members having a set of wooden ribs extending therebetween and a plurality of wooden spars extending lengthwise of the wing, all such components being adhesively secured together. This type of construction is not only time consuming, but requires considerable skill in order to produce a wing which is without distortion and possesses accurate airfoil characteristics. Another conventional form of wing construction utilizes solid wood such as balsa, which avoids the need of fabricating the wing from numerous components but creates the problem of unnecessary weight.

It is, therefore, the principal object of this invention to eliminate the disadvantages of conventional wings as above outlined, this object being attained by the provision of a unitary wing body of low density, homogeneous solidified plastic foam material, the wing body having an airfoil cross-section and being provided in the upper airfoil surface thereof with a concave, longitudinally extending recess in the interests of light weight. A set of ribs is fitted complementally into the recess for reinforcing purposes, the upper edges of the ribs being flush with the upper airfoil surface of the wing, so that suitable skin such as paper or fabric may be stretched thereover. Also, one or more longitudinal spars may be provided in the recess, if so desired. As such, the wing structure of the invention is light in weight, sturdy, and quickly and easily made even by persons of limited skill.

With the foregoing more important object and features in view and such other objects and features as may become apparent as this specification proceeds, the invention will be understood from the following description taken in conjunction with the accompanying drawing, wherein:

The single drawing figure is a fragmentary isometric view of a model aircraft wing constructed in accordance with the invention.

Referring now to the accompanying drawing in detail, the model aircraft wing of the invention is designated generally by the reference numeral 10. The same comprises a wing body 11 of low density, homogeneous solidified foam plastic material, the body having an airfoil cross-section with an upper airfoil surface 12 and a lower airfoil surface 13 terminating at a flat vertical front edge 14 and a flat vertical rear edge 15.

A wooden leading edge member 16 of a substantially semi-circular cross-section is adhesively secured by its flat vertical rear edge to the flat vertical front edge 14 of the wing body 11, the rear edge of the member 16 being contiguous with the body edge 14 so that the leading edge member 16 smoothly matches the airfoil contour of the wing. Similarly, a wooden trailing edge member 17 of a substantially triangular cross-section has a flat vertical front edge which is contiguous with and adhesively secured to the flat vertical rear edge 15 of the wing body, as will be clearly apparent.

The upper surface 12 of the wing body is formed with a concave, longitudinally extending recess 18 in the interests of light weight, but a set of parallel ribs 19 is fitted complementally into the recess 18. Each rib has a convex lower edge 19a in contact with and adhesively secured to the concave bottom of the recess, and a convex upper edge 19b which is flush with the upper airfoil surface 12 so that suitable skin such as paper or fabric may be stretched over the wing.

If desired, one or more longitudinal spars may be also provided in the recess 18 for additional rigidity. One such spar is shown at 20 as passing through suitable notches 21 formed in the ribs 19. The spar may be held in place simply by its positioning in the notches, or adhesive may be used to secure the spar to the ribs if so desired. While the spar has been shown as passing through notches formed in the lower edges 19a of the ribs, such notches may also be located in the upper edges 19b, either to accommodate an additional spar or to locate the spar 20 at the upper surface of the wing.

It will be also understood that while reference has been made only to a wing, the same construction is also applicable to ailerons, elevators, rudders, and the like.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a model aircraft wing, the combination of a wing body of low density homogeneous solidified plastic foam material, said wing body having an airfoil cross-section with upper and lower airfoil surfaces terminating at a flat vertical front edge and a flat vertical rear edge, a wooden leading edge member having a flat vertical rear edge contiguous with and secured to said flat vertical front edge of said wing body, a wooden trailing edge member having a flat vertical front edge contiguous with and secured to said flat vertical rear edge of said wing body, one of said airfoil surfaces of the wing body being provided with a concave longitudinally extending recess, and a set of wooden ribs complementally fitted in said recess, said ribs having convex edges in contact with and secured to the concavity of said recess and also having other convex edges flush with said one of said airfoil surfaces of the wing body.

2. The device as defined in claim 1 together with a wooden spar extending longitudinally in said recess, said spar being seated in notches formed in said ribs.

3. The device as defined in claim 2 wherein said notches are provided in said convex edges of the ribs which are in contact with the concavity of said recess.

References Cited by the Examiner

UNITED STATES PATENTS 2,230,393   2/1941   Thomson.
2,767,436   10/1956  Noland et al.
3,063,191   11/1962  Main _____ 46—79

OTHER REFERENCES

"Pelaspan Expandable Polystyrene," Catalog 170–90, Dow Chemical Co., February 1958, p. 31 relied on.

"Sketchbook," American Modeler, vol. 57, No. 6, March 1962, p. 40 relied on.

RICHARD C. PINKHAM, Primary Examiner.

L. J. BOVASSO, Assistant Examiner.